(12) United States Patent
Morooka

(10) Patent No.: US 7,924,445 B2
(45) Date of Patent: Apr. 12, 2011

(54) PRINTING APPARATUS AND PRINTING METHOD

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 11/622,362

(22) Filed: Jan. 11, 2007

(65) Prior Publication Data

US 2007/0177176 A1 Aug. 2, 2007

(30) Foreign Application Priority Data

Jan. 30, 2006 (JP) .................. 2006-020971

(51) Int. Cl.
G06F 3/12 (2006.01)
G03G 21/00 (2006.01)
G03G 15/00 (2006.01)

(52) U.S. Cl. ....... 358/1.13; 358/1.15; 399/124; 399/397
(58) Field of Classification Search .................. 358/1.13, 358/1.18, 3.32, 1.1, 1.9, 1.12, 296; 399/76, 399/81, 82, 85, 121, 124, 337, 397; 355/72, 355/127; 347/104, 106, 217, 221, 264
See application file for complete search history.

(56) References Cited

U.S. PATENT DOCUMENTS

| | | | | |
|---|---|---|---|---|
| 5,731,879 A * | 3/1998 | Maniwa et al. | ............... | 358/296 |
| 6,169,873 B1 * | 1/2001 | Connolly | ...................... | 399/365 |
| 6,219,502 B1 * | 4/2001 | Osari et al. | ...................... | 399/82 |
| 6,350,072 B1 * | 2/2002 | Nunes et al. | ................... | 400/188 |
| 6,487,382 B2 * | 11/2002 | Underwood et al. | ........... | 399/82 |
| 6,671,472 B2 * | 12/2003 | Shimizu et al. | .................. | 399/82 |
| 6,813,455 B2 * | 11/2004 | Asai | ................................ | 399/82 |
| 6,980,767 B1 * | 12/2005 | Cahill et al. | ................... | 399/408 |
| 7,385,712 B2 * | 6/2008 | Nakagiri et al. | .............. | 358/1.12 |
| 7,431,291 B2 * | 10/2008 | Sato et al. | ................ | 271/265.01 |
| 7,651,092 B2 * | 1/2010 | Hirao et al. | .................... | 271/298 |
| 2001/0022662 A1 * | 9/2001 | Hosoda | ........................... | 358/1.9 |
| 2003/0053816 A1 * | 3/2003 | Asai | .............................. | 399/82 |
| 2004/0156064 A1 * | 8/2004 | Owen et al. | .................. | 358/1.13 |
| 2004/0253010 A1 * | 12/2004 | Takahashi | ....................... | 399/16 |
| 2005/0248811 A1 * | 11/2005 | Nakagiri et al. | ............. | 358/1.18 |
| 2006/0007467 A1 * | 1/2006 | Tsunekawa | ................... | 358/1.13 |
| 2006/0133844 A1 * | 6/2006 | Konno | .............................. | 399/82 |
| 2006/0159480 A1 * | 7/2006 | Mima et al. | ..................... | 399/82 |
| 2007/0171454 A1 * | 7/2007 | Takahashi et al. | ........... | 358/1.14 |
| 2008/0049247 A1 * | 2/2008 | Asai et al. | .................... | 358/1.15 |
| 2008/0143042 A1 * | 6/2008 | Spence et al. | ................. | 271/225 |
| 2009/0252523 A1 * | 10/2009 | Mima et al. | ..................... | 399/82 |

FOREIGN PATENT DOCUMENTS

JP 2005-121716 A 5/2005

* cited by examiner

*Primary Examiner* — Madeleine A Nguyen

(74) *Attorney, Agent, or Firm* — Canon U.S.A., Inc., IP Division

(57) ABSTRACT

A printing method and apparatus, the method and apparatus including inputting a print job, printing the print job, selecting an output mode in which sheets of the print job are either reversed or not reversed before being output to a stacking unit. When printing is performed based on a second print job subsequent to printing performed based on a first print job, the second print job is output in the same output mode as that of the first print job.

3 Claims, 15 Drawing Sheets

| TYPE OF OFFLINE SHEET PROCESSING | FACE UP/FACE DOWN |
|---|---|
| NONE | FACE DOWN (FD) |
| OFFLINE CASE BINDING | FACE UP (FU) |
| OFFLINE SHEET CUTTING | FACE DOWN (FD) |

FIG. 14

| ITEMS | SETTINGS |
|---|---|
| JOB ID | AB001 |
| DOCUMENT SIZE | A4 |
| PAPER (SHEET) SIZE | A4 |
| PRINT ORIENTATION | PORTRAIT |
| PRINT MODE | 1-SIDED |
| SHEET OUTPUT MODE | STACKER |
| TYPE OF OFFLINE SHEET PROCESSING | CASE BINDING |

PRINTING APPARATUS AND PRINTING METHOD

BACKGROUND OF THE INVENTION

1. Field of the Invention

The present invention relates to printing apparatuses and printing methods.

2. Description of the Related Art

A printing apparatus for printing on a sheet and outputting the printed sheet to a stacking unit, such as a paper output tray, is conventionally known. The following two modes are known as output modes (output methods) for outputting a printed sheet to a stacking unit. A first mode is a face-up (FU) output mode in which a sheet is ejected with its printed surface facing upward. A second mode is a face-down (FD) output mode in which a sheet is ejected with its printed surface facing downward. Since a printing apparatus typically includes only one print processing unit for printing on a sheet, the printing apparatus allows switching between the face-up output mode and the face-down output mode by turning the sheet upside down.

There is a known printing apparatus which allows switching between the above-described face-up output mode and face-down output mode according to an instruction from an operator (see, e.g., Japanese Patent Laid-Open No. 2005-121716). This known technique enables the operator of the printing apparatus to select either the face-up output mode or the face-down output mode as desired. However, it is possible that this technique may cause some problems.

When a plurality of sheet bundles corresponding to a plurality of print jobs are to be stacked on a stacking unit of the printing apparatus, the above-described technique allows the operator to instruct the printing apparatus to, for example, eject a sheet bundle corresponding to a first print job in the face-down output mode and to eject a sheet bundle corresponding to a second print job in the face-up output mode. In this case, the sheet bundle ejected in the face-down output mode and the sheet bundle ejected in the face-up output mode are placed on the stacking unit of the printing apparatus in a mixed manner.

A problem may arise if a plurality of sheet bundles corresponding to a plurality of print jobs are printed by the printing apparatus and, for example, collectively processed by a sheet processing apparatus outside the printing apparatus. That is, a problem may arise if sheet processing is performed collectively on the mixture of sheet bundles ejected in the face-down output mode and face-up output mode. For example, if a stack of sheets is to be cut off at one end by the sheet processing apparatus, a problem will occur unless sheet bundles ejected in the face-down output mode and sheet bundles ejected in the face-up output mode are sorted appropriately. Specifically, some sheet bundles may be cut off at the right ends of printed surfaces, while other sheet bundles may be cut off at the left ends of printed surfaces.

SUMMARY OF THE INVENTION

The present invention has been made in view of the circumstances described above and provides an improved printing apparatus and an improved printing method.

According to an aspect of the present invention, a printing apparatus includes an input unit configured to input a print job including image data for a plurality of pages, a printing unit configured to perform printing on a plurality of sheets based on the print job input by the input unit, a stacking unit configured to stack the plurality of sheets printed by the printing unit, a reversing unit configured to reverse at least one sheet printed by the printing unit before the at least one sheet is placed on the stacking unit, and a selecting unit configured to select either a first output mode in which at least one sheet printed by the printing unit is reversed by the reversing unit and output to the stacking unit or a second output mode in which at least one sheet printed by the printing unit is output to the stacking unit without being reversed by the reversing unit, wherein when printing is performed based on a second print job subsequent to printing performed based on a first print job, the selecting unit selects an output mode selected for outputting the first print job as an output mode for the second print job.

Further features of the present invention will become apparent from the following description of exemplary embodiments with reference to the drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 14 illustrates printing condition information for a print job.

DESCRIPTION OF THE EXEMPLARY EMBODIMENTS

Figure 1:
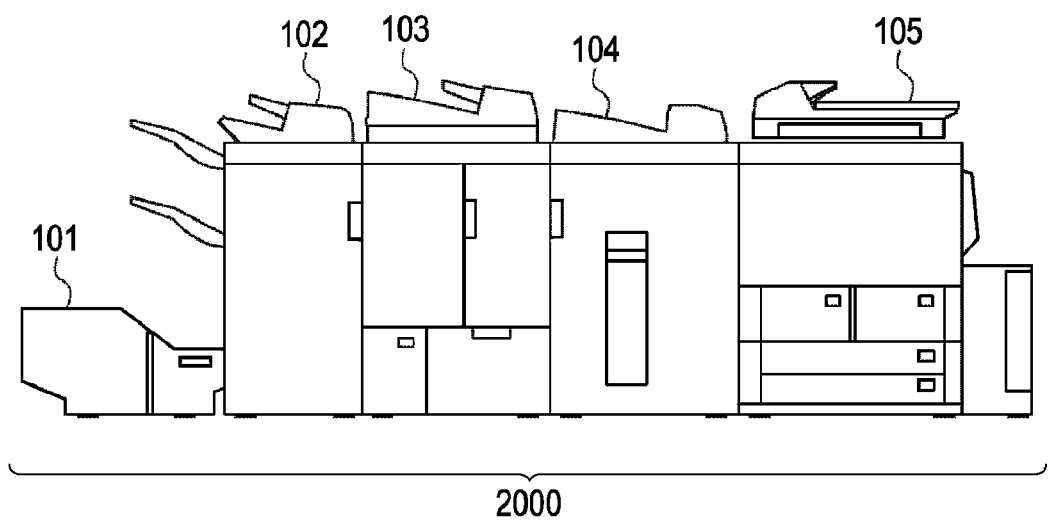
FIG. 1 illustrates an exemplary overall configuration of a printing system.

The present invention will now be described in detail with reference to the attached drawings showing various exemplary embodiments thereof. In the drawings, elements and parts which are identical throughout the views are designated by identical reference numerals, and duplicate description thereof is omitted.

First Exemplary Embodiment (Overall Configuration of Printing Apparatus (Printing System))

FIG. 1 illustrates an exemplary overall configuration of a printing system (printing apparatus) 2000 corresponding to the present exemplary embodiment. In FIG. 1, a printing apparatus 105 performs printing on a sheet on the basis of image data and transports the printed sheet to a stacker apparatus 104, which places the printed sheet transported from the printing apparatus 105 on a stacker tray (described below). The stacker apparatus 104 is also capable of transporting the printed sheet transported from the printing apparatus 105 to a case binding apparatus 103 without placing it on the stacker tray.

The case binding apparatus 103 stacks, on a collection tray (not shown), a plurality of sheets transported from the printing apparatus 105 via the stacker apparatus 104 as a sheet bundle. The case binding apparatus 103 covers the sheet bundle on the collection tray with a cover sheet placed on a cover-sheet stacking tray (not shown) to produce a case-bound product. The case binding apparatus 103 is also capable of transporting the sheets transported from the stacker apparatus 104 to a saddle stitching apparatus 102 without placing them on the collection tray.

The saddle stitching apparatus 102 staples the sheet bundle comprised of the plurality of sheets transported from the printing apparatus 105 via the case binding apparatus 103, and thereby produces a saddle-stitched product. The saddle-stitched product produced by the saddle stitching apparatus 102 is transported to a sheet cutting apparatus 101 and subjected to sheet cutting, which is a type of sheet processing and in which at least one end of a sheet bundle comprised of a plurality of sheets is cut off.

While FIG. 1 illustrates the printing system (printing apparatus) 2000 including the printing apparatus 105, stacker apparatus 104, saddle stitching apparatus 102, and sheet cutting apparatus 101, the printing system 2000 may be configured differently. The printing system 2000 corresponding to the present exemplary embodiment can be produced by combining at least the printing apparatus 105 and the stacker apparatus 104.

(Control Configuration of Printing Apparatus)

Figure 2:
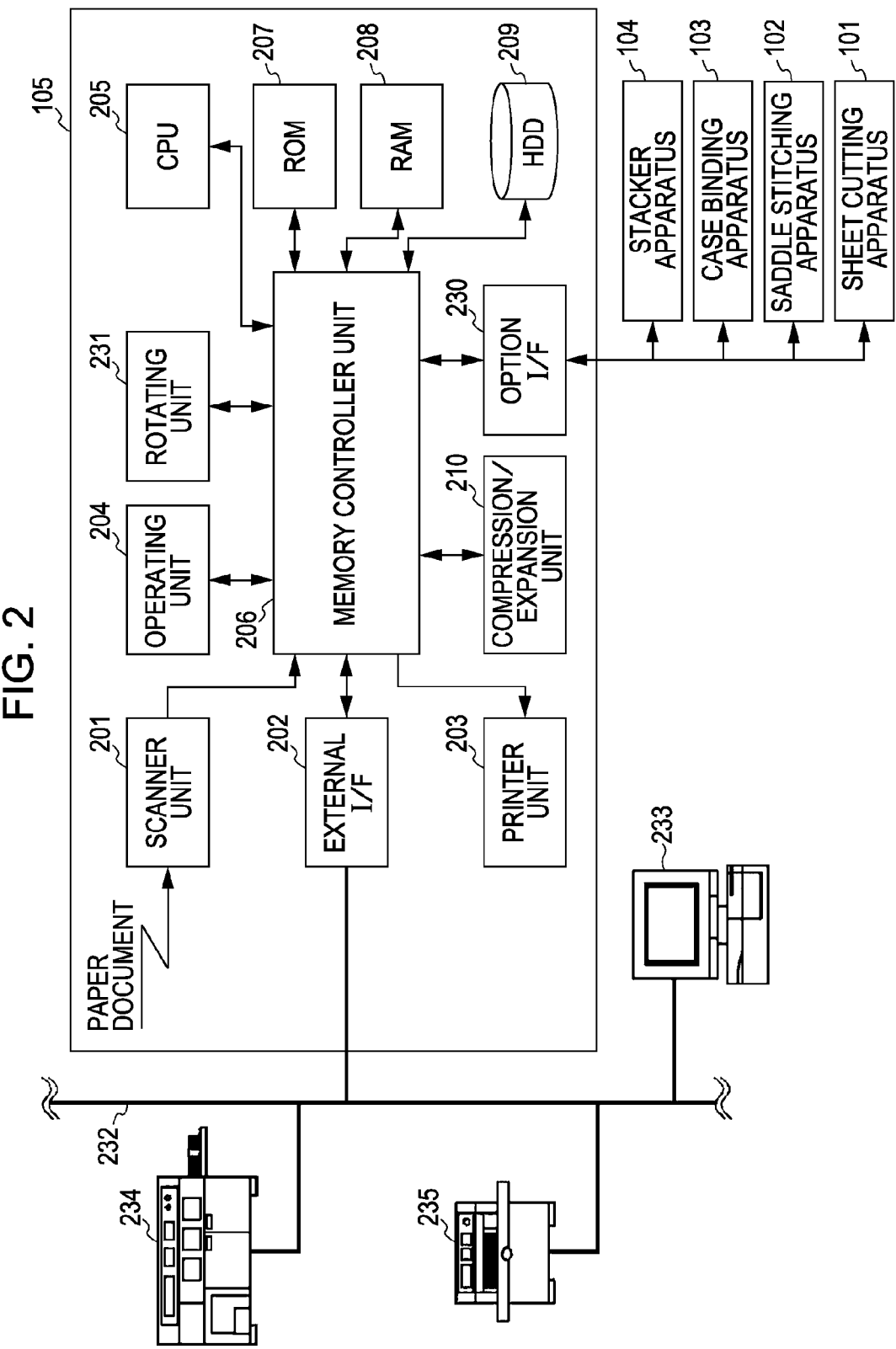
FIG. 2 is a block diagram illustrating an exemplary control configuration of a printing apparatus.

FIG. 2 is a block diagram illustrating an exemplary control configuration of the printing apparatus 105 corresponding to the present exemplary embodiment. In FIG. 2, a scanner unit 201 optically reads a plurality of documents (i.e., sheets of paper or the like on which images are printed) to generate image data, and performs image processing (e.g., shading correction) on the read image data. Then, the scanner unit 201 stores, as a single print job, the processed image data for a plurality of pages in a hard disk (HDD) 209. An external interface (I/F) 202 receives a print job including image data for a plurality of pages via a network 232 from a computer terminal 233 connected to the printing apparatus 105. The external I/F 202 stores the print job received from the computer terminal 233 in the hard disk 209.

A printer unit 203 performs printing on a plurality of sheets on the basis of a print job stored in the hard disk 209. Since the print job includes image data for a plurality of pages, a plurality of pieces of image data are printed on the respective sheets. An operating unit 204 receives various instructions from an operator of the printing apparatus 105, transmits the received instructions to a memory controller unit 206, and thus configures various settings for the printing apparatus 105. The external I/F 202 is connected, via the network 232, to an offline case-binding apparatus 234 and to an offline sheet-cutting apparatus 235.

The case binding apparatus 103 operates in a mode (hereinafter referred to as an "online mode") in which it directly receives printed sheets transported from the printing apparatus 105. On the other hand, the offline case-binding apparatus 234 processes a sheet bundle comprised of printed sheets output to the stacker apparatus 104 of the printing system 2000 and transported by the operator. Thus, a mode in which a sheet bundle transported by the operator is received, but not in which sheets printed by the printing apparatus 105 are directly received, is referred to as an "offline mode".

The sheet cutting apparatus 101 operates in a mode (hereinafter referred to as an "online mode") in which it directly receives printed sheets transported from the printing apparatus 105. On the other hand, the offline sheet-cutting apparatus 235 performs sheet cutting on a sheet bundle comprised of printed sheets output to the stacker apparatus 104 of the printing system 2000 and transported by the operator.

Typically, the offline case-binding apparatus 234 performs case binding on a sheet bundle already processed by the sheet cutting apparatus 101. Therefore, in the printing system 2000 of the present embodiment, a sheet bundle output to the stacker apparatus 104 is first transported by the operator to the offline sheet-cutting apparatus 235, which performs sheet cutting thereon. Then, the sheet bundle processed by the offline sheet-cutting apparatus 235 is transported by the operator to the offline case-binding apparatus 234, which performs case binding thereon. The offline case-binding apparatus 234 has basically the same configuration as that of the case binding apparatus 103, except that the offline case-binding apparatus 234 is not directly connected to the printing apparatus 105. Similarly, the offline sheet-cutting apparatus 235 has basically the same configuration as that of the sheet cutting apparatus 101, except that the offline sheet-cutting apparatus 235 is not directly connected to the printing apparatus 105.

A central processing unit (CPU) 205 writes a program read from a read-only memory (ROM) 207 to a random-access memory (RAM) 208. The CPU 205 executes the program by using the RAM 208 to control the entire printing system 2000 including the printing apparatus 105. The ROM 207 stores a program for interpreting page description language (PDL) code data received, as a print job, from an external apparatus by the external I/F 202. Additionally, the ROM 207 stores a program for generating data printable by the printer unit 203 after the interpretation of the PDL code data. The memory controller unit 206 controls access from each part to the ROM 207, RAM 208, and hard disk 209.

By using one of various compression methods, such as a Joint Bi-level Image Experts Group (JBIG) method and a Joint Photographic Experts Group (JPEG) method, a compression/expansion unit 210 is capable of compressing image data stored in the RAM 208 and hard disk 209. The compression/expansion unit 210 is capable also of expanding image data compressed by one of various compression methods, such as those described above.

Before image data stored in the hard disk 209 is sent to the printer unit 203 and printed, a rotating unit 231 rotates the image data if necessary. The rotating unit 231 is capable of performing rotation at an arbitrary angle, such as 180-degree rotation for turning the image data upside down or 90-degree rotation. The CPU 205 configures the settings of the angle of rotation performed by the rotating unit 231.

An option I/F 230 is an interface for the CPU 205 to communicate with the stacker apparatus 104, case binding apparatus 103, saddle stitching apparatus 102, and sheet cutting apparatus 101 that are optional apparatuses connected to the printing apparatus 105. Each of the stacker apparatus 104, case binding apparatus 103, saddle stitching apparatus 102, and sheet cutting apparatus 101 has a CPU (not shown) for controlling its internal operation. The CPU 205 of the printing apparatus 105 sends a control command for controlling the CPU of each optional apparatus through the option I/F 230 to control the stacker apparatus 104, case binding apparatus 103, saddle stitching apparatus 102, and sheet cutting apparatus 101.

(Configuration of Printing Apparatus)

Figure 3:
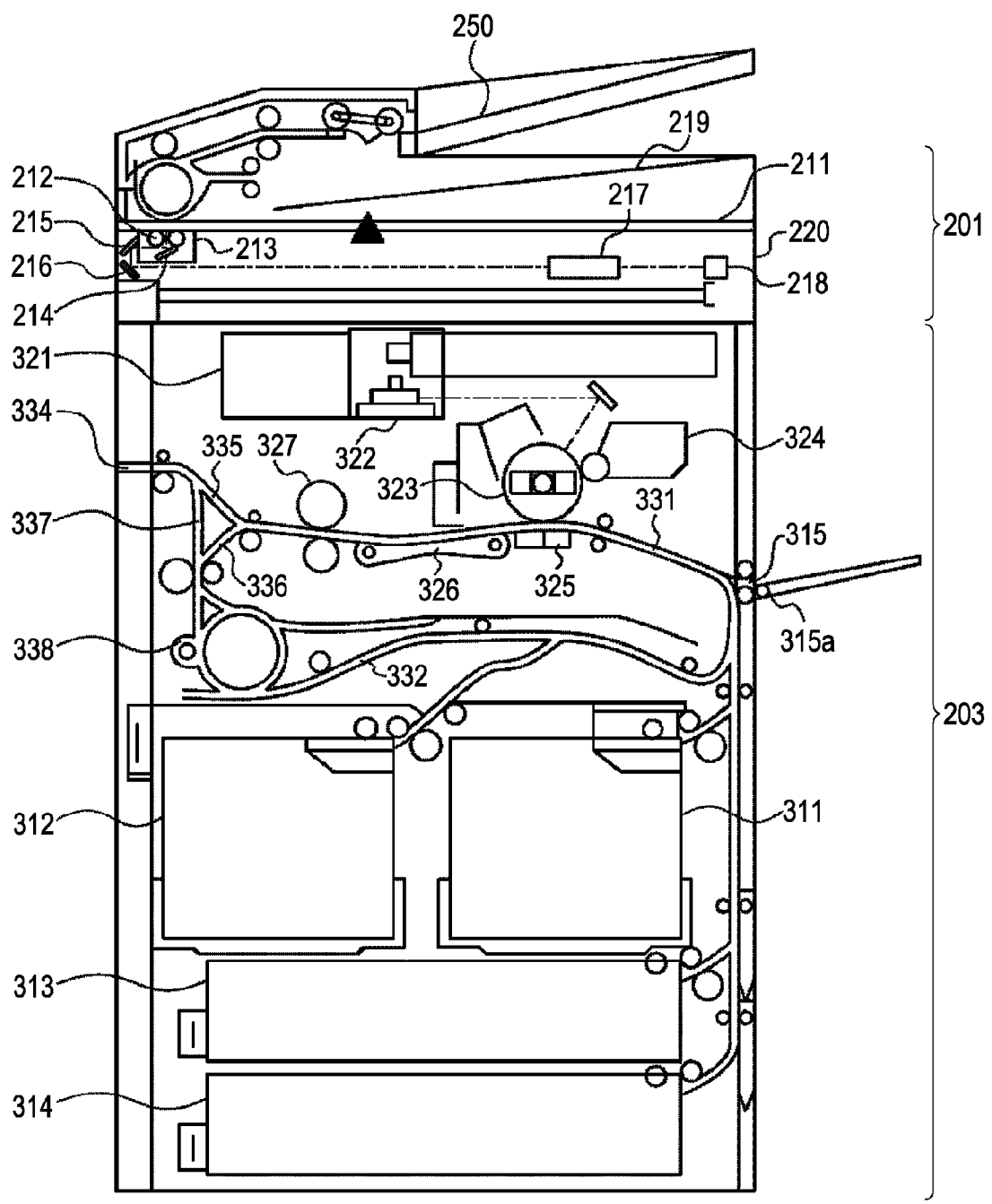
FIG. 3 is a cross-sectional view illustrating an exemplary configuration of the printing apparatus.

Next, an exemplary configuration of the printing apparatus 105 will be described with reference to FIG. 3.

The printing apparatus 105 mainly includes the scanner unit 201 and the printer unit 203. The scanner unit 201 transports a bundle of document sheets stacked on a document feeder 250 to a glass platen 211 one by one sequentially from the top of the bundle. Upon completion of the reading operation of a scanning device 220, the document feeder 250 ejects each document sheet to an output tray 219. When a document sheet is transported to the glass platen 211, the scanning device 220 turns on a lamp 212, allows an optical device 213 to start moving, and scans the document sheet while illuminating it from beneath. Light reflected from the document sheet passes through a plurality of mirrors 214, 215, and 216 and a lens 217, and is guided to a charge-coupled device (CCD) image sensor 218, which reads an image on the scanned document sheet as an image data. The image data read by the CCD image sensor 218 is subjected to predetermined image processing and stored in the hard disk 209.

The printer unit 203 emits, from a laser emitter 322 driven by a laser driver 321, a laser beam corresponding to image data read out of the hard disk 209. A photoconductive drum 323 is irradiated with the laser beam. An electrostatic latent image corresponding to the laser beam is thus formed on the photoconductive drum 323. A developer 324 causes developing material (e.g., toner) to adhere to the electrostatic latent image portion on the photoconductive drum 323.

Simultaneously with the start of laser beam irradiation, a sheet is fed from any one of a cassette 311, a cassette 312, a cassette 313, a cassette 314, or a manual feed tray 315, and is transported along a conveying path 331 to a transfer device 325. The manual feed tray 315 is provided with a sheet sensor 315a for detecting that the sheet has been placed on the manual feed tray 315. The transfer device 325 transfers toner on the photoconductive drum 323 to the sheet, which is then transported on a conveying belt 326 to a fusing device 327. The sheet is heated by the fusing device 327, and thereby the toner on the sheet is fixed onto the sheet, which is then transported along conveying paths 335 and 334 to the stacker apparatus 104.

The sheet is transported (ejected) to the stacker apparatus 104 either in a face-up output mode or face-down output mode. The face-up output mode is a mode in which the sheet is ejected with its printed surface upward, that is, the sheet transported from the conveying path 335 is ejected from the conveying path 334 without being reversed. On the other hand, the face-down output mode is a mode in which the sheet is ejected with its printed surface downward, that is, the sheet transported from the conveying path 335 is ejected from the conveying path 334 after being reversed. Specifically, in the face-down output mode, the CPU 205 controls the printer unit 203 such that the sheet having passed through the fusing device 327 is guided to conveying paths 336 and 338 without being transported to the conveying path 335. Then, the sheet is transported backward along a conveying path 337 and the conveying path 334, and ejected to the stacker apparatus 104. The printing apparatus 105 can eject the sheet to the stacker apparatus 104 by using either the face-down output mode or face-up output mode, according to an instruction from the CPU 205.

(Configuration of Stacker Apparatus)

Next, an exemplary configuration of the stacker apparatus 104 will be described with reference to FIG. 13.

Figure 9:
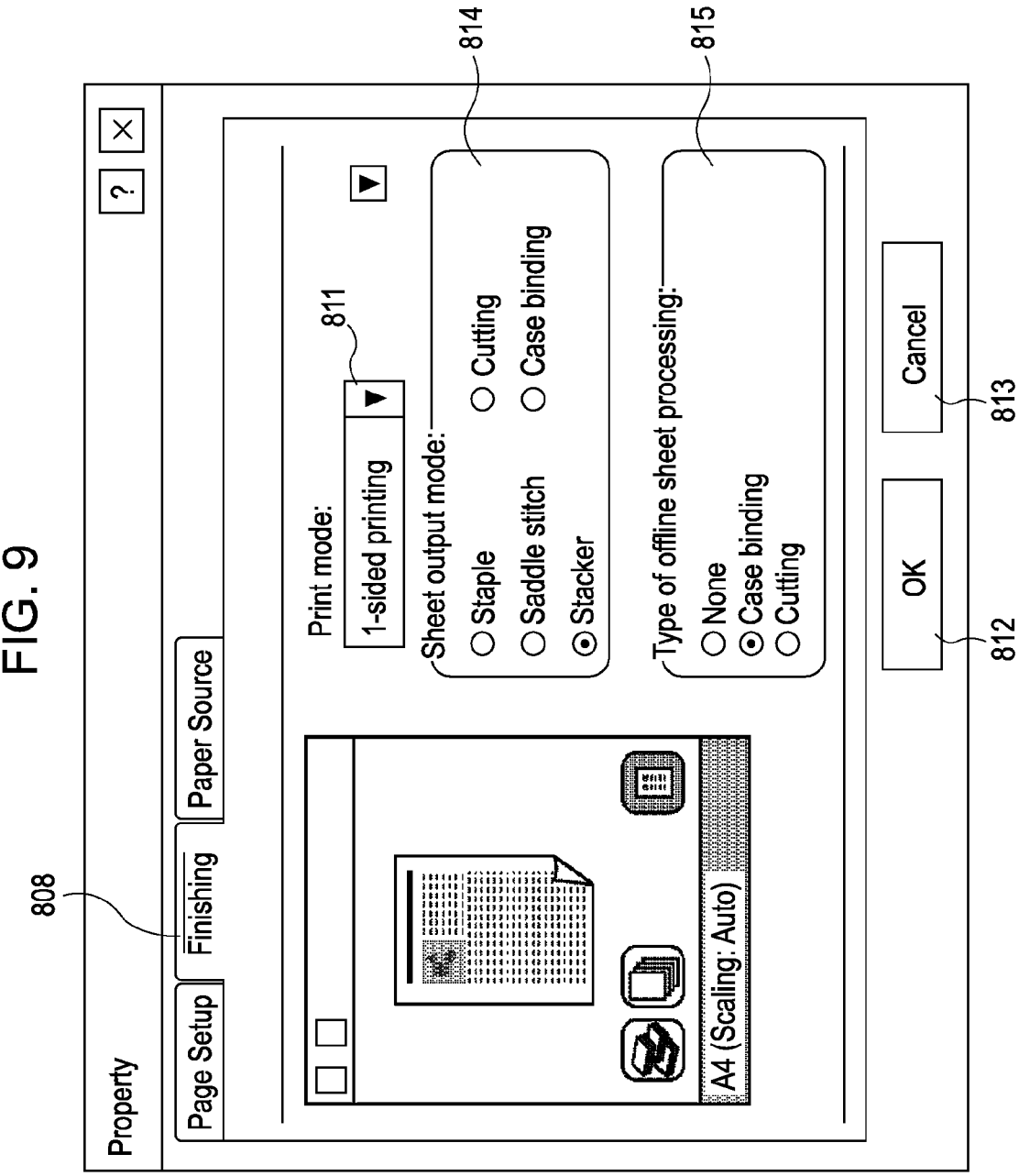
FIG. 9 illustrates a screen that appears when a finishing tab is selected in the property setting user interface of FIG. 8.

The stacker apparatus 104 receives printed sheets from the printing apparatus 105. A sheet S received by the stacker apparatus 104 from the printing apparatus 105 passes along a conveying path 1301 and is placed on a stacker tray 1304. The sheet S transported from the printing apparatus 105 is placed on the stacker tray 1304 if, as illustrated in FIG. 9 and described below, "stacker" is selected as the output mode of the sheet S. If "case binding" or "saddle stitch" is selected as the output mode of the sheet S in FIG. 9, the sheet S passes along a conveying path 1305 and is ejected to the case binding apparatus 103. Spring members 1302 are compressed by the weight of the sheet S placed on the stacker tray 1304. Since the stacker tray 1304 is vertically lowered as the weight of sheets on the stacker tray 1304 increases, the positional relationship between the sheet on the top surface of the stacker tray 1304 and the conveying path 1301 remains constant. The spring members 1302 and the stacker tray 1304 are secured to a carrier 1303. Therefore, sheets stacked on the stacker tray 1304 can be easily transported with the carrier 1303 to the offline case-binding apparatus 234 or to the offline sheet-cutting apparatus 235. This eliminates the need for the operator to carry sheet bundles.

A conveying path 1307 ejects printed sheets in the printing apparatus 105 if, for example, an error occurs in the printing system 2000 during transport of sheets. A sheet S having passed along the conveying path 1307 is transported to an escape tray 1306. A sheet sensor 1308 detects whether any sheet S is placed on the stacker tray 1304. If the sheet sensor 1308 detects that a sheet S is placed on the stacker tray 1304, the stacker apparatus 104 sends information indicating this detection result through the option I/F 230 to the CPU 205. On the other hand, if the sheet sensor 1308 detects that a sheet S is not placed on the stacker tray 1304, the stacker apparatus 104 sends information indicating this detection result through the option I/F 230 to the CPU 205. This enables the CPU 205 to determine whether a sheet S is placed on the stacker tray 1304 of the stacker apparatus 104.

(Configuration of Operating Unit)

Figure 4:
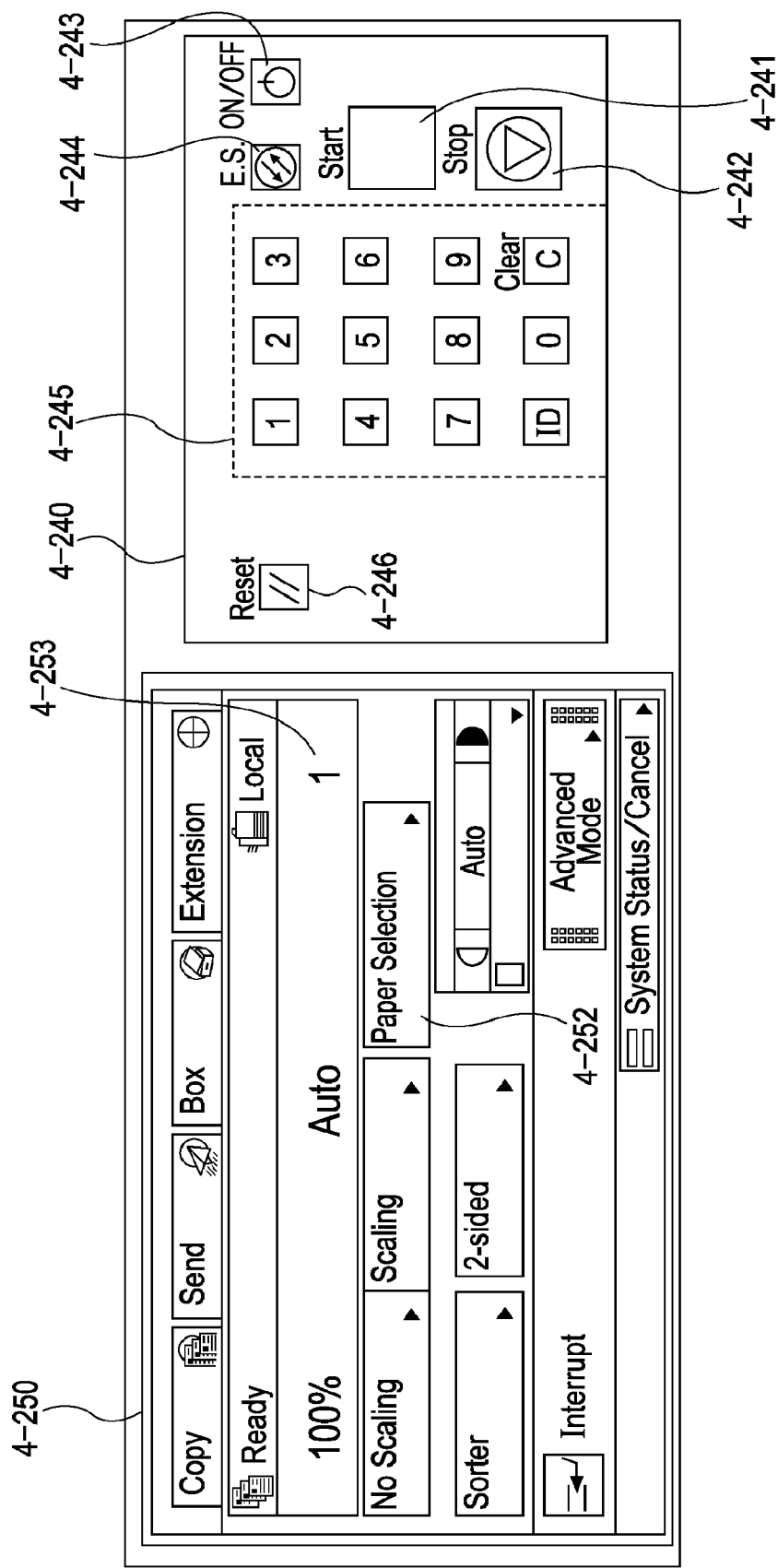
FIG. 4 illustrates an exemplary configuration of an operating unit of the printing apparatus.

Next, an exemplary configuration of the operating unit 204 of the printing apparatus 105 will be described with reference to FIG. 4.

The operating unit 204 provides a hard key group 4-240 including various hard keys 4-241 to 4-246. The operating unit 204 also provides a dot-matrix liquid crystal display 4-250, which is provided with a touch panel on its surface. When the operator of the printing apparatus 105 presses any displayed key, the operating unit 204 detects the corresponding key input and sends a signal corresponding to the key input to the CPU 205. The CPU 205 controls the printing apparatus 105 on the basis of a program stored in the ROM 207 and executes operation corresponding to the received signal.

The power key 4-243 is a key for turning power ON/OFF. The energy saving key 4-244 is a key for entering or exiting an energy saving mode. The start key 4-241 allows the operator to input an instruction for starting various types of processing.

For example, pressing the start key 4-241 causes the scanner unit 201 to start reading an image on a document. The stop key 4-242 allows the operator to input an instruction to cause the printing system 2000 including the printing apparatus 105 to interrupt operation during execution.

A key group 4-245 has 0 to 9 numeric keys which allow the operator to input the number of copies to be printed, other functions, such as zoom factor, requiring numerical inputs, and a clear key for clearing the input. The number of copies input using the key group 4-245 is displayed on a liquid crystal display 4-253. The reset key 4-246 is a key used to reset settings defined by the operator through the liquid crystal display 4-250 or the hard key group 4-240.

The liquid crystal display 4-250 displays, for example, the operating status of the printing system 2000 according to an instruction from the CPU 205. The liquid crystal display 4-250 also displays touch keys. In the liquid crystal display 4-250, a key 4-252 is used to select a cassette on which sheets to be printed on by the printing apparatus 105 are stacked. When the operator presses the key 4-252, the CPU 205 controls the operating unit 204 such that a paper selection screen is displayed on the liquid crystal display 4-250.

(Transmission of Print Job from Computer Terminal to Printing Apparatus)

Figure 5:
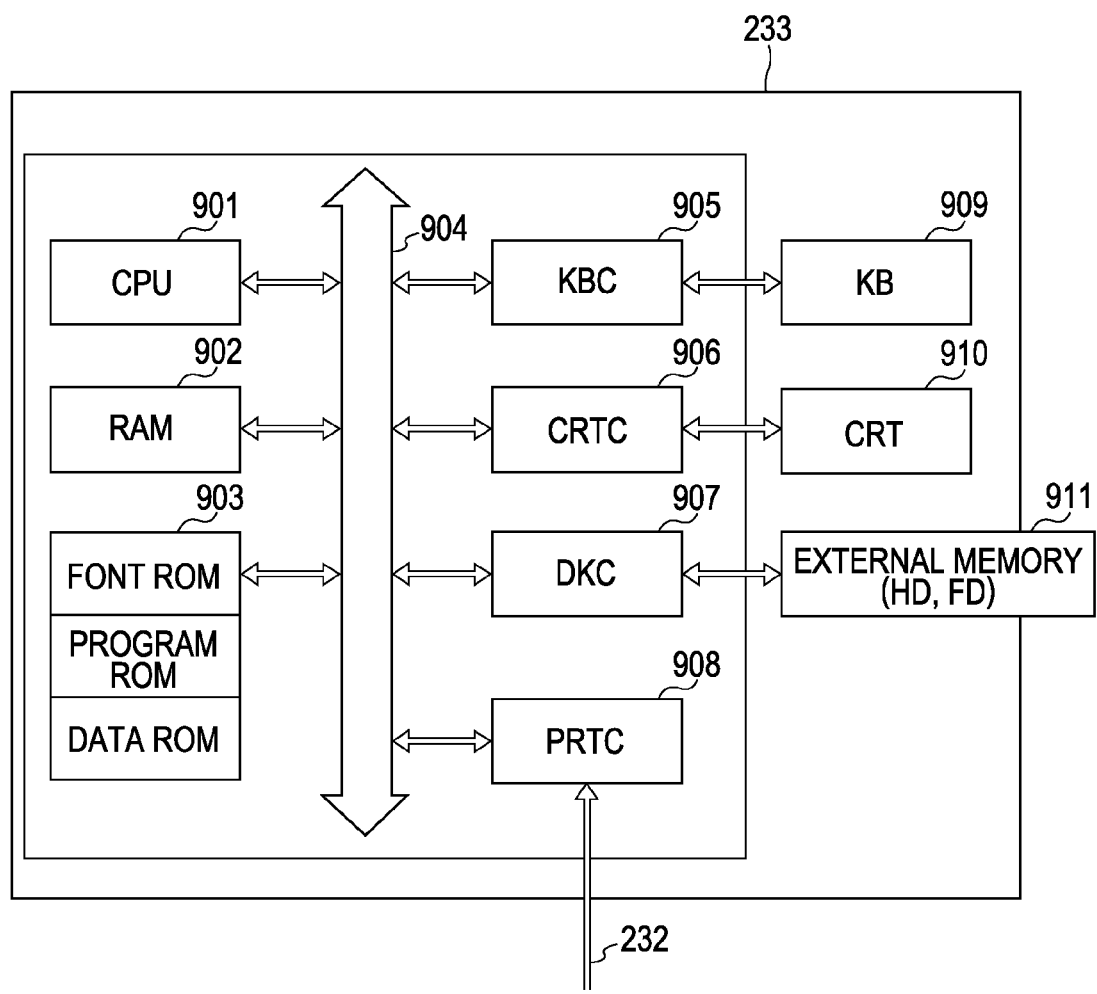
FIG. 5 illustrates an exemplary configuration of a computer terminal.

FIG. 5 illustrates an exemplary configuration of the computer terminal 233. The transmission of a print job from the computer terminal 233 to the printing apparatus 105 will now be described with reference to FIG. 5.

Referring to FIG. 5, the computer terminal 233 includes a CPU 901 capable of executing the processing of a document containing graphics, images, text, and tables (including spreadsheets) on the basis of, for example, a document processing program stored in a program ROM of a ROM 903 or in an external memory 911. The CPU 901 has control over devices connected to a system bus 904. An operating system program (hereinafter referred to as an "OS") serving as a control program for the CPU 901 and a printer driver (described below) are also stored in the program ROM of the ROM 903 or in the external memory 911. Font data or the like to be used in document processing is stored in a font ROM of the ROM 903 or in the external memory 911. Various types of data to be used in document processing are stored in a data ROM of the ROM 903 or in the external memory 911. A RAM 902 serves, for example, as a main memory of the CPU 901 and a work area for the CPU 901.

A keyboard controller (KBC) 905 controls key input from a keyboard (KB) 909 and a pointing device (not shown). A cathode-ray tube controller (CRTC) 906 controls display of a cathode-ray tube display (CRT) 910. A disk controller (DKC) 907 controls access to the external memory 911, such as a hard disk (HD) or a floppy disk (FD). The external memory 911 stores a boot program, various application programs, a printer-control-command generating program (hereinafter referred to as a "printer driver"), and the like. A printer controller (PRTC) 908 is connected to the printing apparatus 105 via the network 232 and executes processing for communicating with the printing apparatus 105.

Figure 6:
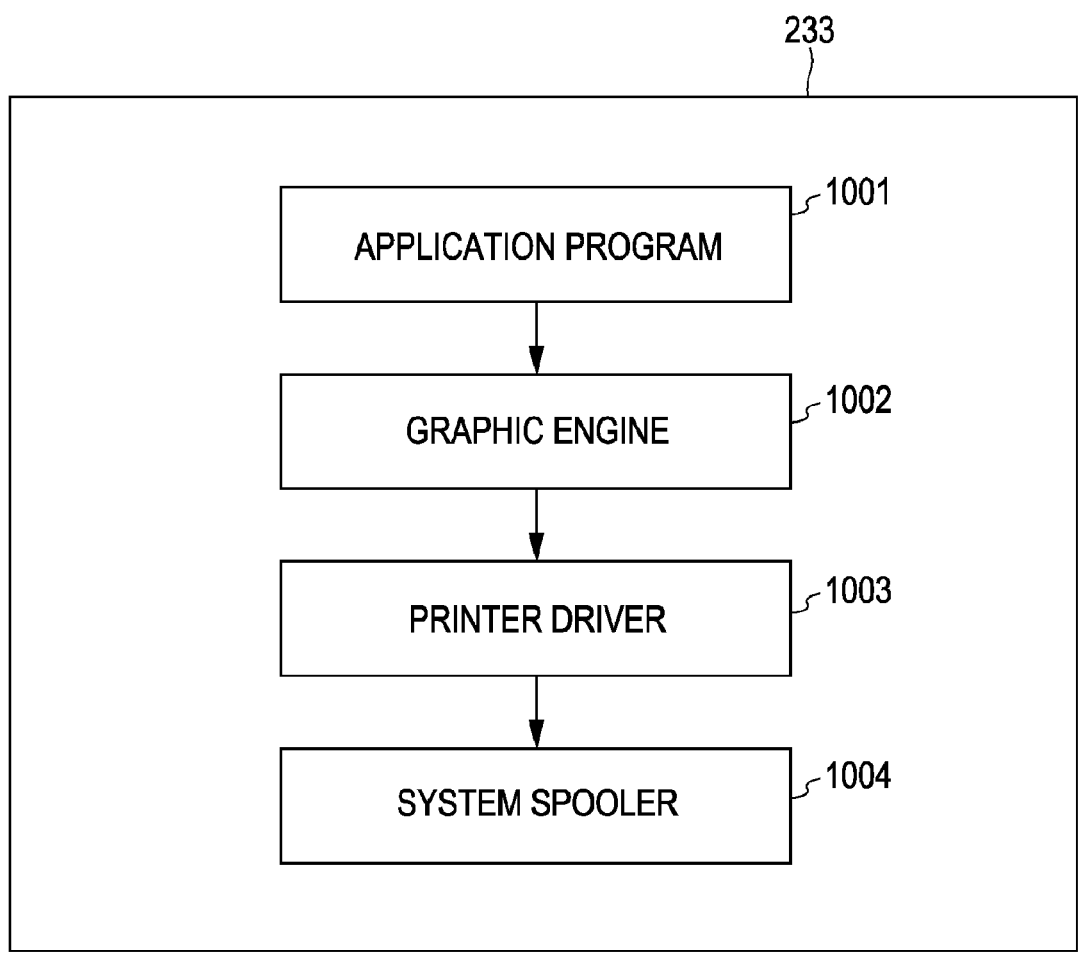
FIG. 6 illustrates an exemplary software configuration of the computer terminal.

FIG. 6 illustrates an exemplary software configuration of the computer terminal 233. An application program 1001, a graphic engine 1002, the printer driver 1003, and a system spooler 1004 are programs stored in the external memory 911.

The application program 1001 stored in the external memory 911 is loaded to the RAM 902 and executed. When a print job is sent from the application program 1001 to the printing apparatus 105, the graphic engine 1002 is loaded to the RAM 902 and is used to perform output (i.e., drawing) operation.

Data output by the graphic engine 1002 is sent to the printer driver 1003 that is loaded from the external memory 911 to the RAM 902 and executed by the CPU 901. The printer driver 1003 converts the data received from the graphic engine 1002 into a control command (e.g., PDL command) that can be interpreted by the printing apparatus 105. The control command is output to the printing apparatus 105 through the system spooler 1004 that is loaded to the RAM 902 by the OS and via the network 232. Such a control command is referred to as a "print job".

For the printer driver 1003 to create a print job, printing conditions need to be set, typically through a window (displayed on the CRT 910 of FIG. 5) provided by the printer driver 1003. Then, the printer driver 1003 adds the printing conditions set through the window by the operator of the computer terminal 233 to the print job.

Figure 7:
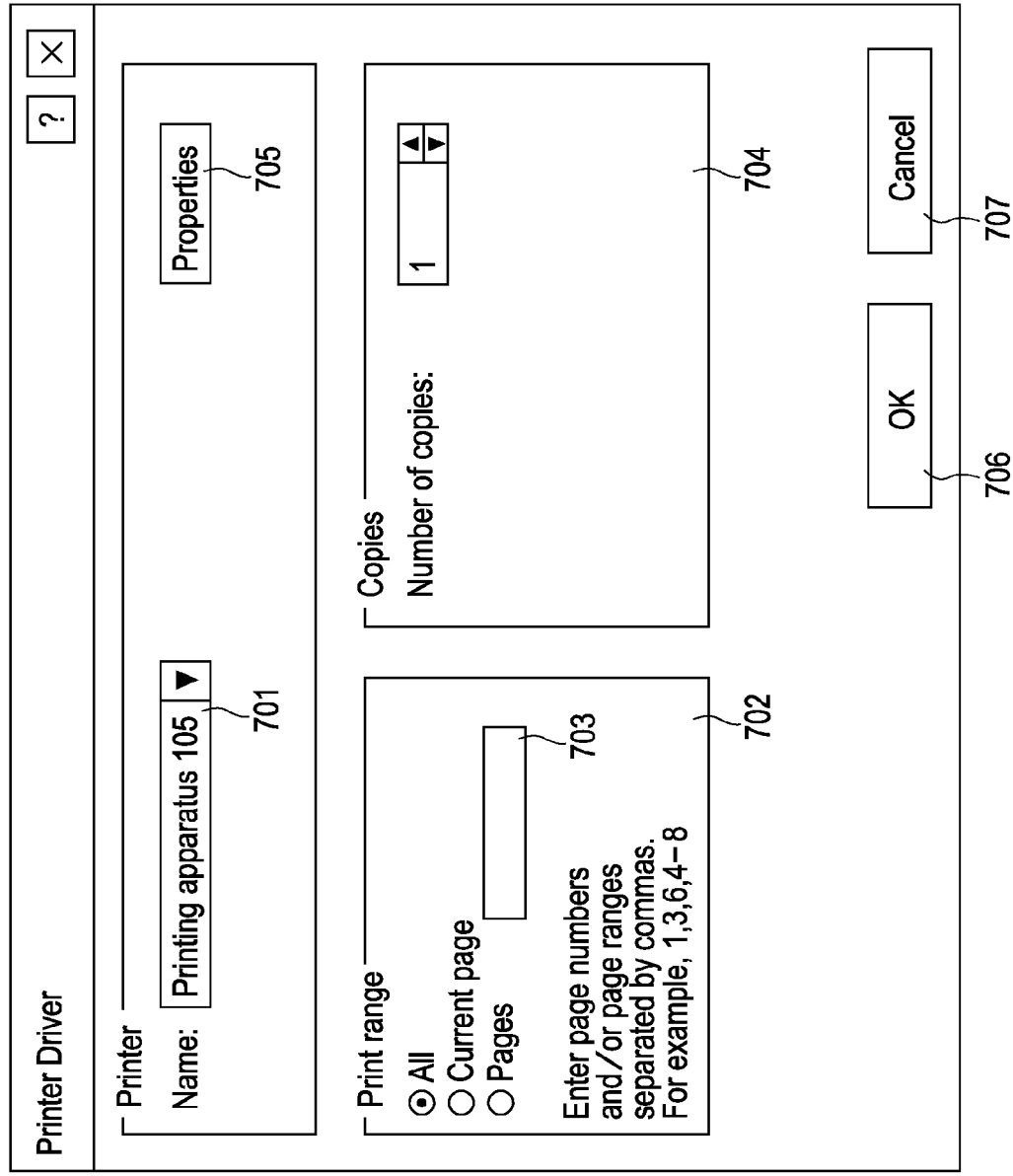
FIG. 7 illustrates a window for setting printing conditions in a printer driver installed on the computer terminal.

FIG. 7 illustrates a window for setting printing conditions in the printer driver 1003 installed on the computer terminal 233.

The computer terminal 233 causes the window of FIG. 7 to be displayed on the CRT 910 by starting the printer driver 1003 during the creation of a document by using the application program 1001.

In the window of FIG. 7, the operator (i.e., user) of the computer terminal 233 operates a printer-name selection box 701 with the pointing device (not shown) or the like. This operation allows the printing apparatus 105 or another printing apparatus to be selected as a destination to which the computer terminal 233 sends a print job. In FIG. 7, the computer terminal 233 selects the printing apparatus 105 as a destination. The operator of the computer terminal 233 operates a print-range selection box 702 with the pointing device or the like. This operation allows one or more desired pages of a document created by the application program 1001 to be specified as a print range. If the operator selects "All", the printer driver 1003 sets all pages of a document created by the application program 1001 as targets to be printed. If the operator selects "Current page", the printer driver 1003 selects, from a plurality of pages of a document created by the application program 1001, a page currently displayed on the CRT 910 and sets the selected page as a target to be printed. If the operator selects "Pages", the printer driver 1003 selects, from a plurality of pages of a document created by the application program 1001, one or more pages corresponding to page numbers entered in an edit box 703 as targets to be printed. The printer driver 1003 sets a number entered in a copy-count setting box 704 by the operator as the number of copies to be printed.

Upon completion of the setting of printing conditions for a print job to be sent to the printing apparatus 105, the operator of the computer terminal 233 presses an OK button 706. This causes the printer driver 1003 to start creating a print job. The operator of the computer terminal 233 presses a cancel button 707 to interrupt the creation of a print job.

Figure 8:
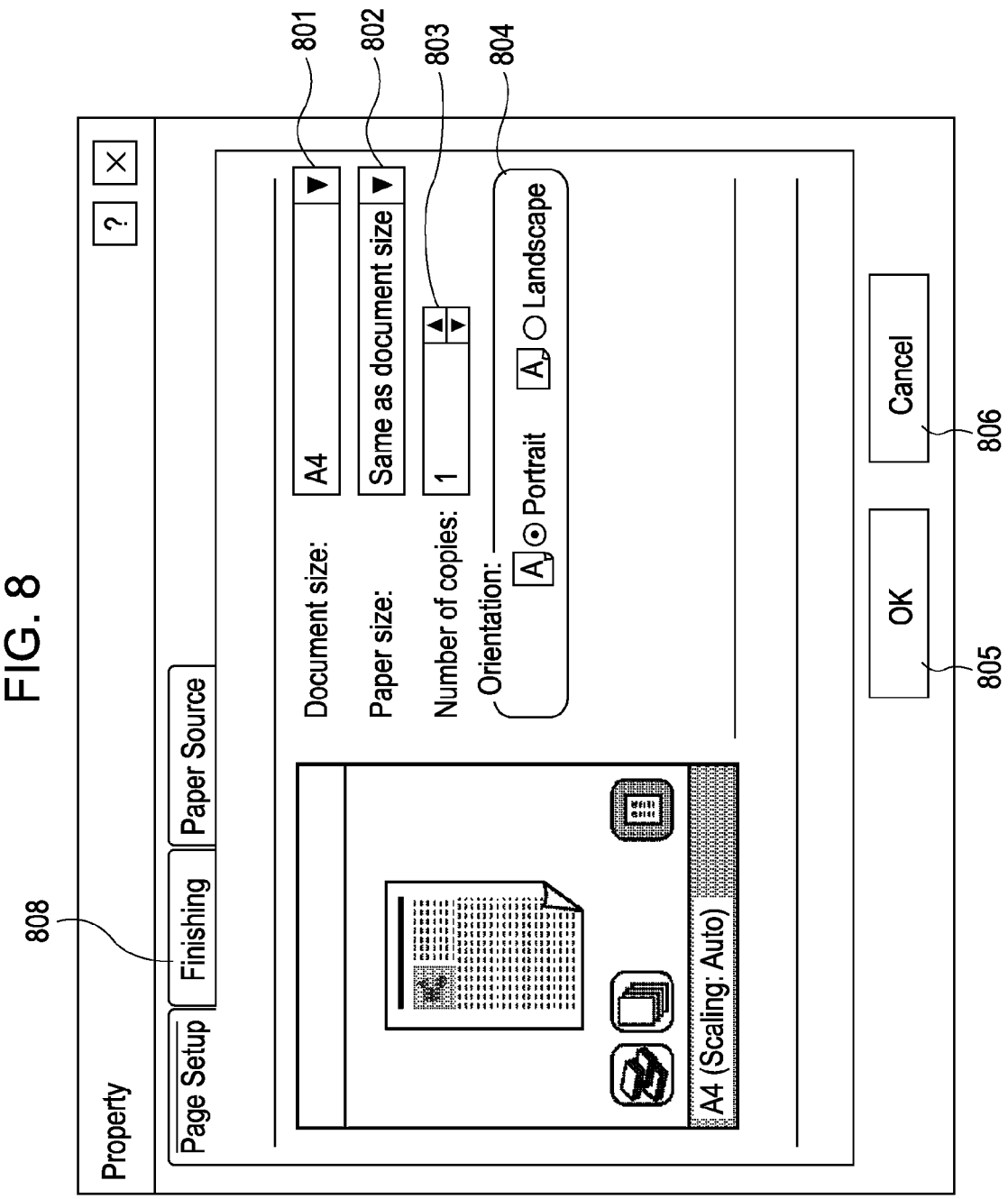
FIG. 8 illustrates a property setting user interface that appears when a property button is pressed in the window of FIG. 7.

FIG. 8 illustrates a property setting user interface that appears when a properties button 705 is pressed in the window of FIG. 7 for the printer driver 1003.

The operator of the computer terminal 233 operates a document-size selection box 801 with the pointing device (not shown) or the like. This operation causes the printer driver 1003 to select the document size of each page of a document edited by the application program 1001. Since typically the document size of a document edited by the application program 1001 has already been specified, this specified document size ("A4" in FIG. 8) is automatically selected. If the operator selects "Same as document size" in an output-paper-size selection box 802, the printer driver 1003 selects A4 size as the size of a sheet to be used by the printing apparatus 105 for printing (i.e., output processing). Instead of selecting "Same as document size", the operator can select a desired sheet size, such as "A3 size" or "B5 size", as an output paper size. However, since in this case a size different from the document size is selected, the printer driver 1003 creates a print job while changing the scaling factor. When the operator enters the desired number of copies in a copy-count selection box 803, the printer driver 1003 sets the entered number of copies for the print job. The printer driver 1003 inputs a print orientation selected in a print-orientation selection box 804 by the operator.

If the operator selects an OK button 805, values entered in the document-size selection box 801, output-paper-size selection box 802, copy-count selection box 803, and print-orientation selection box 804 are confirmed. On the other hand, if the operator selects a cancel button 806, values entered in the boxes 801, 802, 803, and 804 are not confirmed and reset to predetermined default values.

FIG. 9 illustrates a screen that appears when a finishing tab 808 is selected in the property setting user interface of FIG. 8 for the printer driver 1003.

The operator of the computer terminal 233 operates a print-mode selection box 811 with the pointing device (not shown) or the like. This operation allows the printer driver 1003 to select a print mode (i.e., one of the printing conditions) for the printing apparatus 105 to process a print job. Possible print modes are "1-sided (single-sided) printing" for printing on only one side of a sheet and "2-sided (duplex) printing" for printing both sides of a sheet.

The operator of the computer terminal 233 operates a sheet-output-mode selection box 814 with the pointing device (not shown) or the like. This operation allows the printer driver 1003 to select an output mode for outputting a sheet printed by the printing apparatus 105. Possible sheet output modes are "staple", "saddle stitch", "cutting", "case binding", and "stacker". "Staple" is a mode in which sheets are stapled by the saddle stitching apparatus 102 and then output. In this mode, a plurality of sheets printed by the printing apparatus 105 are output (i.e., ejected) after being stapled at one end thereof. "Saddle stitch" is a mode in which sheets are saddle stitched by the saddle stitching apparatus 102 and then output. In this mode, a plurality of sheets printed by the printing apparatus 105 are output (i.e., ejected) after being stapled and folded at the center thereof. "Cutting" is a mode in which sheets are subjected to cutting operation performed by the sheet cutting apparatus 101 and then output. In this mode, a plurality of sheets printed by the printing apparatus 105 are output (i.e., ejected) after being cut at one end thereof. "Case binding" is a mode in which sheets are case-bound by the case binding apparatus 103 and then output. In this mode, a plurality of sheets printed by the printing apparatus 105 are output (i.e., ejected) after being covered with a cover sheet and glued.

The operator of the computer terminal 233 operates an offline-sheet-processing selection box 815 with the pointing device (not shown) or the like. The offline-sheet-processing selection box 815 is selectable only when "Stacker" is selected in the sheet-output-mode selection box 814. This operation allows the printer driver 1003 to select a type of offline sheet processing to be performed on a sheet bundle ejected to the stacker apparatus 104. Types of the offline sheet processing include a method in which no offline sheet processing is performed, a method using the offline case-binding apparatus 234, and a method using the offline sheet-cutting apparatus 235.

If the operator selects an OK button 812, values entered in the print-mode selection box 811, sheet-output-mode selection box 814, and offline-sheet-processing selection box 815 are confirmed. On the other hand, if the operator selects a cancel button 813, values entered in the print-mode selection box 811, sheet-output-mode selection box 814, and offline-sheet-processing selection box 815 are not confirmed and reset to predetermined default values.

(Procedure for Printing: One-Sided Printing)

Figure 10:
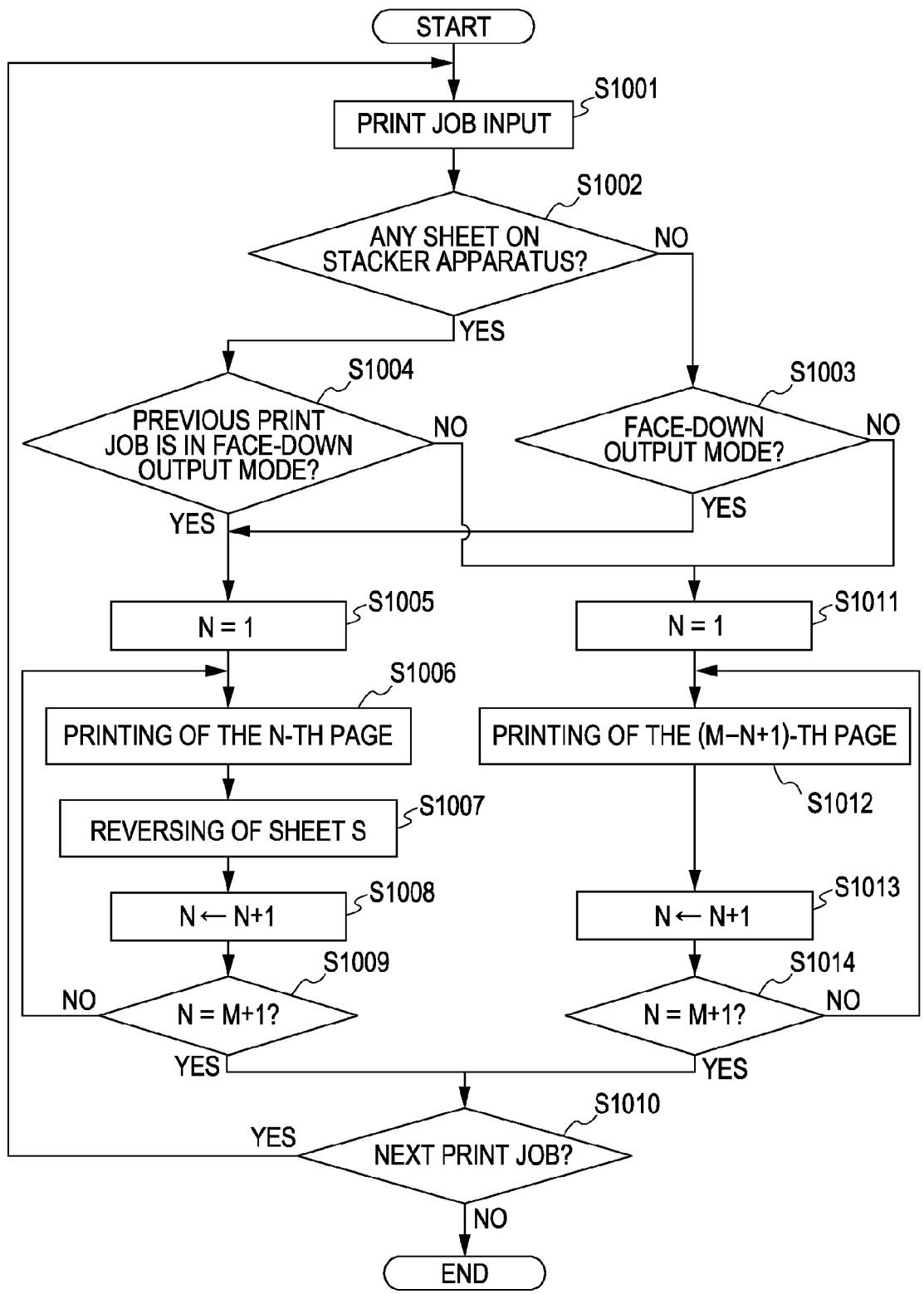
FIG. 10 is a flowchart illustrating a printing procedure.

Next, a printing procedure of the first exemplary embodiment will be described with reference to FIG. 10. The following description refers to printing performed when "stacker" is selected as a sheet output mode in the sheet-output-mode selection box 814 of FIG. 9. FIG. 10 illustrates operation performed when "1-sided printing" for printing only one side of a sheet is selected in the print-mode selection box 811 of FIG. 9.

In step S1001, the CPU 205 executes input processing to input a print job. Here, the input processing is executed by receiving a print job (i.e., image data) from the computer terminal 233. Specifically, upon receipt of a print job from the computer terminal 233, the external I/F 202 allows image data included as control code in the print job to be written to the hard disk 209. Then, the memory controller unit 206 reads the print job from the hard disk 209, outputs the read print job to the printer unit 203, and thereby inputs image data for a plurality of pages.

In step S1002, the CPU 205 determines whether any sheet is placed on the stacker tray 1304 of the stacker apparatus 104. If the CPU 205 determines there is at least one sheet on the stacker tray 1304, the process proceeds to step S1004. If there are no sheets on the stacker tray 1304, the process proceeds to step S1003.

In step S1003, the CPU 205 selects either a face-down output mode or a face-up output mode as a paper output mode on the basis of printing condition information included in a print job having been input in step S1001. Here, the printing condition information included in the print job is information such as that shown in FIG. 14. Values entered by the operator through the printer driver 1003, as described above with reference to FIGS. 7 to 9, are set as the printing condition information. FIG. 12 illustrates a table stored in the hard disk 209 of the printing apparatus 105. The table defines paper output modes corresponding to the respective types of offline sheet processing. The CPU 205 obtains information shown in the table of FIG. 12 from the offline case-binding apparatus 234 and the offline sheet-cutting apparatus 235 via the network 232. Alternatively, the information illustrated in the table of FIG. 12 may be pre-stored in the hard disk 209.

In the present embodiment, when one or more sheets are placed on the stacker tray 1304 of the stacker apparatus 104, there are three methods for the execution of offline processing. In the first method, the sheets are only placed on the stacker tray 1304 of the stacker apparatus 104, and no subsequent offline sheet processing is performed on the sheets. In the second method, the sheets are case-bound by the offline case-binding apparatus 234. In the third method, cutting processing is performed on the sheets by the offline sheet-cutting apparatus 235. The table of FIG. 12 defines the output modes corresponding to the respective methods.

Figures 12, 13:
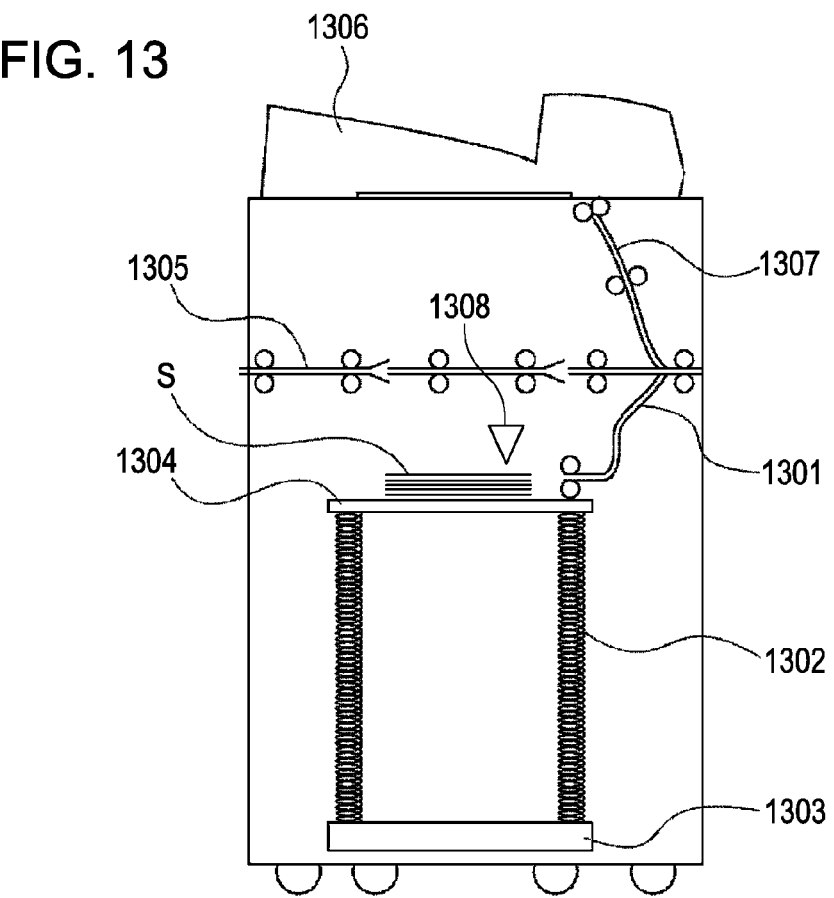
FIG. 12 illustrates a table stored in a hard disk of the printing apparatus.
FIG. 13 illustrates an exemplary configuration of a stacker apparatus.

In FIG. 12, the first method in which no offline sheet processing is performed is associated with the face-down output mode. In this mode, the printing apparatus 105 starts printing at the first page of a print job. While receiving a print job from the computer terminal 233, the CPU 205 of the printing apparatus 105 sequentially analyzes control data (i.e., PDL data) included in the print job and converts the analyzed control data into print data printable by the printer unit 203. When receiving a print job, the printing apparatus 105 first receives data corresponding to the first page, then receives data corresponding to the second, third, fourth, etc. pages one by one, and last receives data corresponding to the last page. If image data for a plurality of pages is included in the print job, the corresponding print data is generated sequentially from a portion corresponding to the first page, since the CPU 205 analyzes control data sequentially from a portion corresponding to the first page. The face-down output mode, which allows sequential printing from the first page, has an advantage in that printing can be started immediately after the generation of print data for the first page.

In FIG. 12, the second method in which offline case binding is performed as offline sheet processing is associated with the face-up output mode. In this mode, the printing apparatus 105 starts printing at the last page of a print job. The face-up output mode, which allows sequential printing from the last page, has a disadvantage in that printing cannot be started until print data for the last page is generated. However, for the offline case-binding apparatus 234 of FIG. 2, to start case binding, a bundle of sheets is to be placed on a tray (not shown) with the printed surfaces of all the sheets facing upward (face up). That is, it is necessary that the sheets be stacked face up on the stacker tray 1304 of the stacker apparatus 104. Therefore, offline case binding is associated with the face-up output mode.

In FIG. 12, the third method in which offline sheet cutting is performed as offline sheet processing is associated with the face-down output mode. For the offline sheet-cutting apparatus 235 of FIG. 2 to start sheet cutting, a bundle of sheets is to be placed on a tray (not shown) with the printed surfaces of all the sheets facing downward (face down). That is, it is necessary that the sheets be stacked face down on the stacker tray 1304 of the stacker apparatus 104. Therefore, offline sheet cutting is associated with the face-down output mode.

Referring back to step S1003 of FIG. 10, since case binding is set in the printing condition information of FIG. 14 and the case binding is associated with the face-up output mode as shown in FIG. 12, the process proceeds to step S1011.

In step S1011, the CPU 205 sets an initial value of "1" as page identification information N for controlling the procedure of printing image data for a plurality of pages. The page identification information N is information stored in the RAM 208 and readable and writable by the CPU 205.

In step S1012, the CPU 205 causes the printer unit 203 to print image data for the (M−N+1)-th page, where M denotes the number of pages of the print job to be processed. For example, M is set to "10" for a print job including image data for ten pages. Here, the page to be processed is set to the (M−N+1)-th page such that the printer unit 203 starts printing at the M-th page, in other words, the last page. Unlike in the case of the face-down output mode, the sheet is not reversed in the face-up output mode so as to be placed on the stacker tray 1304 with its printed surface face-up (i.e., with its printed surface facing upward).

In step S1013, the CPU 205 increments the page identification information N by one. The process then proceeds to step S1014, where the CPU 205 determines whether the page identification information N has become equal to M+1. If it is determined that N=M+1 is true, the process proceeds to step S1010, and if it is not, the process returns to step S1012.

Figure 15:
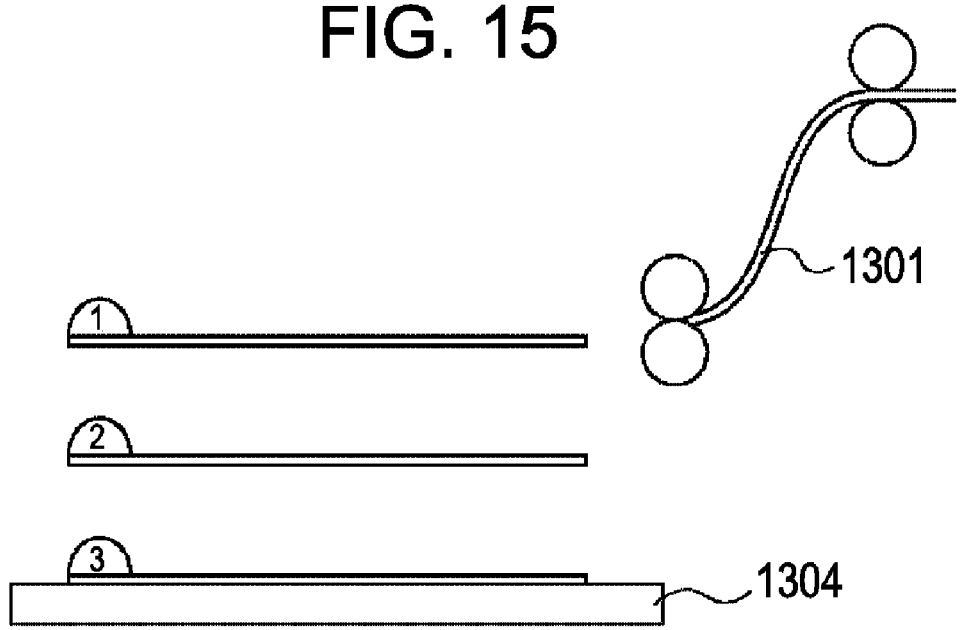
FIG. 15 is a schematic illustration of a sheet bundle placed on a stacker tray.

By repeating steps S1012 to S1014 described above, the CPU 205 allows a plurality of sheets to be stacked on the stacker tray 1304 to form a sheet bundle. FIG. 15 is a schematic illustration of the sheet bundle placed on the stacker tray 1304. FIG. 15 corresponds to a case in which a print job including image data for three pages is executed, and illustrates the sheets stacked face-up (i.e., stacked with their printed surfaces facing upward) on the stacker tray 1304. In the printing procedure in this case, image data for the third page has been printed first and image data for the first page has been printed last.

The foregoing steps S1011 to S1014 correspond to a procedure in the face-up output mode. The following description refers to steps S1005 to S1009 that are to be executed when the CPU 205 selects the face-down output mode in step S1003.

As described above, the foregoing steps S1011 to S1014 correspond to the procedure in which the print job including image data for a plurality of pages is processed in reverse order from the M-th page, (M−1)-th page, . . . , the second page, and the first page. On the other hand, steps S1005 to S1009 correspond to the procedure in which the print job is processed in order from the first page, the second page, . . . , the (M−1)-th page, and the M-th page.

In step S1005, the CPU 205 sets an initial value of "1" as page identification information N for controlling the procedure of printing image data for a plurality of pages.

In step S1006, the CPU 205 causes the printer unit 203 to print image data for the N-th page. Then, in step S1007, the CPU 205 causes the printer unit 203 to reverse and eject the sheet to the stacker apparatus 104. The sheet is reversed so as to be placed on the stacker tray 1304 with its printed surface face-down (i.e., with its printed surface facing downward).

In step S1008, the CPU 205 increments the page identification information N by one. The process then proceeds to step S1009, where the CPU 205 determines whether the page identification information N has become equal to M+1. If it is determined that N=M+1 is true, the process proceeds to step S1010, and if it is not, the process returns to step S1006.

Figure 16:
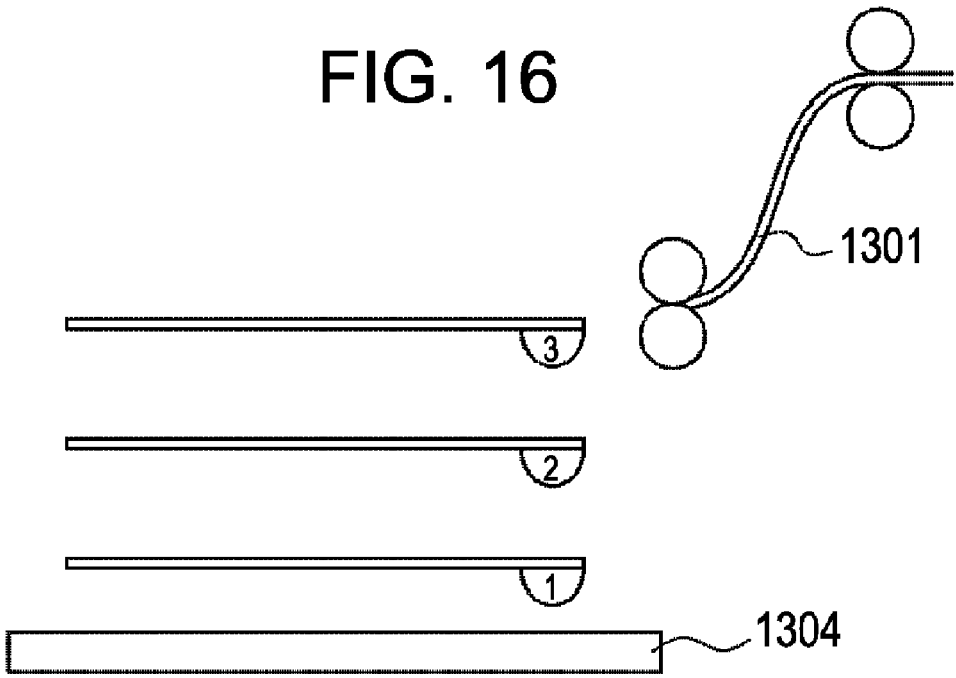
FIG. 16 is a schematic illustration of a sheet bundle placed on the stacker tray.

By repeating steps S1006 to S1009 described above, the CPU 205 allows a plurality of sheets to be stacked on the stacker tray 1304 to form a sheet bundle. FIG. 16 is a schematic illustration of the sheet bundle placed on the stacker tray 1304. FIG. 16 corresponds to a case in which a print job including image data for three pages is executed, and illustrates the sheets stacked face-down (i.e., stacked with their printed surfaces facing downward) on the stacker tray 1304. In the print procedure in this case, image data for the first page has been printed first and image data for the third page has been printed last.

In step S1010, the CPU 205 determines whether there is still another print job to be executed. If there is, the process returns to step S1001, and if there is not, the processing ends.

After the process returns to step S1001, the CPU 205 inputs another print job. The process then proceeds to step S1002. If processing of one print job has already been completed, one or more sheets are stacked on the stacker tray 1304. Therefore, the process proceeds from step S1002 to step S1004.

In step S1004, the CPU 205 determines whether the output mode of the immediately preceding print job is the face-down output mode. If the CPU 205 determines that it is the face-down output mode, the process proceeds to step S1005. If the CPU 205 determines that it is the face-up output mode, the process proceeds to step S1011. In step S1004, the CPU 205 executes printing in the same output mode as that of the immediately preceding print job without referring to the tables of FIG. 12 and FIG. 14. The CPU 205 makes the determination in step S1004 to prevent sheet bundles output in the face-down and face-up output modes from being mixed together on the stacker tray 1304. For example, if the first print job, the second print job, and the third print job in which "stacker", "saddle stitch", and "stacker", respectively, are selected as sheet output modes are executed in this order, the immediately preceding print job for the third job is the first job.

(Procedure for Printing: Two-Sided Printing)

Figure 11:
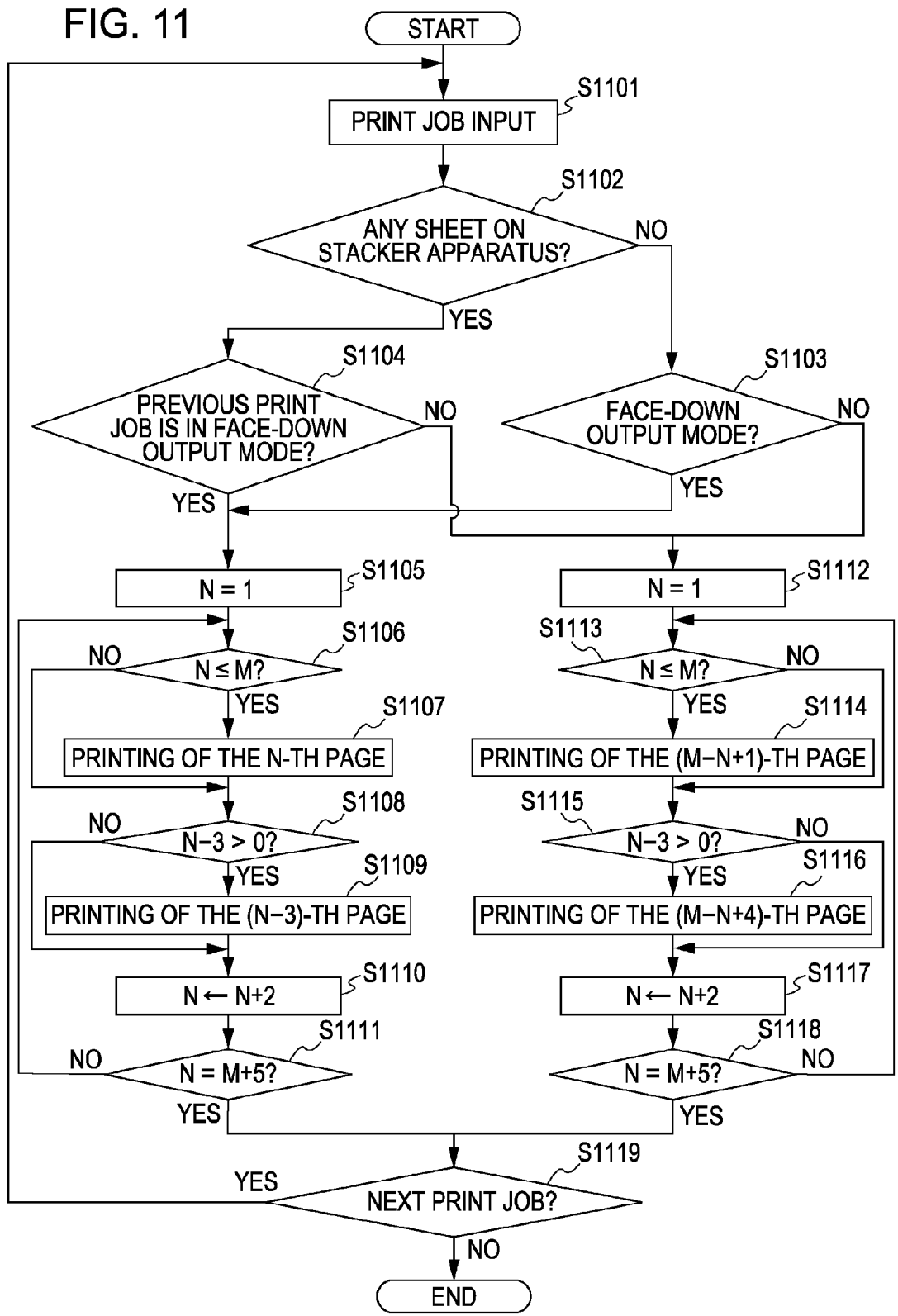
FIG. 11 is a flowchart illustrating a printing procedure.

Next, a printing procedure of the present embodiment will be described with reference to FIG. 11. The following description refers to printing performed when "stacker" is selected as a sheet output mode in the sheet-output-mode selection box 814 of FIG. 9. FIG. 11 illustrates operation performed when "2-sided printing" for printing both sides of a sheet is selected in the print-mode selection box 811 of FIG. 9.

Steps S1101 to S1104 and S1119 of FIG. 11 will not be described herein, as they are substantially the same as steps S1001 to S1004 and S1010 of FIG. 10.

Steps S1105 to S1111 correspond to a procedure in which a print job including image data for a plurality of pages (M pages) is processed in order from the first page to the M-th page. On the other hand, steps S1112 to S1118 correspond to a procedure in which the print job is processed in reverse order from the M-th page to the first page. The two-sided printing of FIG. 11 in which both sides of each sheet are to be printed is different from a print mode in which the first page, the second page, the third page, and the like are processed one by one in this order.

In step S1105, the CPU 205 sets an initial value of "1" as page identification information N. In step S1106, the CPU 205 determines whether the page identification information N is equal to or less than M. If it is, the process proceeds to step S1107, and if it is not, the process proceeds to step S1108.

In step S1107, the CPU 205 causes a sheet to be fed and executes printing of the N-th page on the sheet. In step S1108, the CPU 205 determines whether N−3 is greater than zero. If it is, the process proceeds to step S1109, and if it is not, the process proceeds to step S1110. In step S1109, the CPU 205 executes printing of the (N−3)-th page on the sheet transported from a refeeding path 332 (see FIG. 3). Here, "3" indicates the number of sheets that can be held in the printing apparatus 105. For two-sided printing, the printing apparatus 105 performs printing on three sheets sequentially fed from a cassette. Then, printing of an even-numbered page on a sheet transported from the refeeding path 332 and printing of an odd-numbered page on a sheet fed from the cassette are alternately repeated to print on both sides of the sheets. The number of sheets that can be held in the printing apparatus 105 is not limited to three, and any number of sheets that would enable practice of the present invention is applicable.

In step S1110, the CPU 205 adds two to N. The process then proceeds to step S1111, where the CPU 205 determines whether the page identification information N has become equal to M+5. If it is determined that N=M+5 is true, the process proceeds to step S1119, and if it is not, the process returns to step S1106.

The order of printing that the CPU 205 causes the printer unit 203 to perform in steps S1105 to S1111 will now be described. The following description refers to the case in which a print job includes image data for ten pages and the cassette 311 is selected as the location where the sheets will be fed from.

First, the CPU 205 causes the printer unit 203 to feed three sheets from the cassette 311, and to print image data for the first, third, and fifth pages on the three respective sheets. Then, the CPU 205 causes the printer unit 203 to transport these three printed sheets along the refeeding path 332 toward the transfer device 325 with their printed surfaces facing downward.

Next, the CPU 205 causes the printer unit 203 to send a sheet on which image data for the first page has been printed to the transfer device 325, where image data for the second page is printed on the sheet. Then, the CPU 205 causes the printer unit 203 to transport, to the stacker apparatus 104, the sheet on which image data for both the first and second pages has been printed. Next, the CPU 205 causes the printer unit 203 to print image data for the seventh page on a sheet fed from the cassette 311.

Then, the CPU 205 causes the printer unit 203 to transport a sheet on which image data for the third page has been printed to the transfer device 325, where image data for the fourth page is printed on the sheet. Next, the CPU 205 causes the printer unit 203 to print image data for the ninth page on a sheet fed from the cassette 311. Subsequently, the CPU 205 causes the printer unit 203 to sequentially transport, along the refeeding path 332 to the transfer device 325, the sheets on which image data for the fifth, seventh, and ninth pages has been printed. Then, the CPU 205 causes the printer unit 203 to print image data for the sixth, eighth, and tenth pages on the sheets on which image data for the fifth, seventh, and ninth pages, respectively, has been printed.

Figure 17:
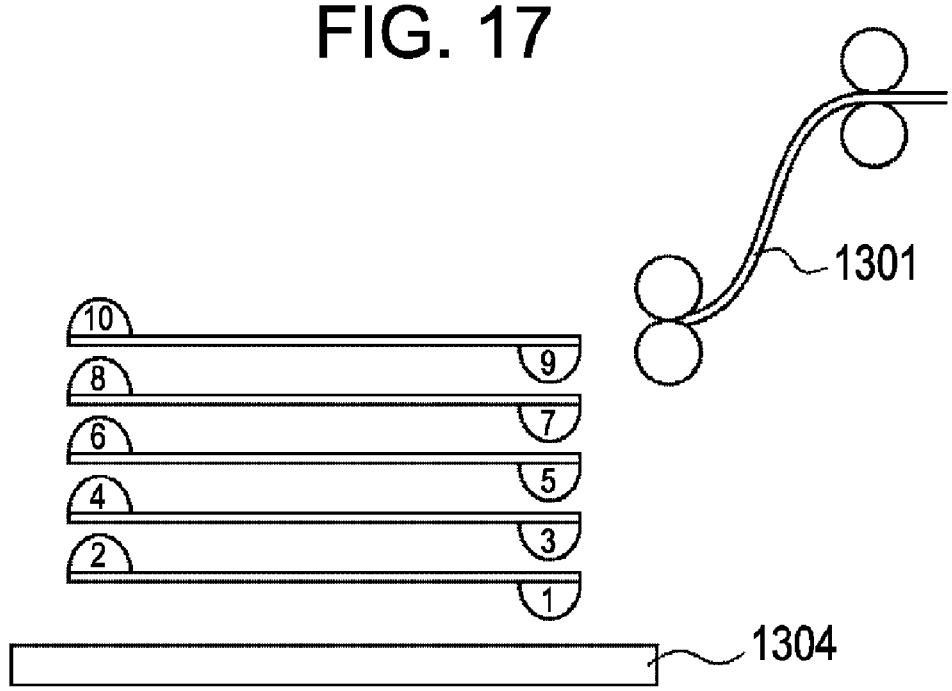
FIG. 17 is a schematic illustration of a sheet bundle placed on the stacker tray.

Thus, the order of printing of image data for a plurality of pages is 1-3-5-2-7-4-9-6-8-10. FIG. 17 is a schematic illustration of a sheet bundle placed on the stacker tray 1304 in this case. Numbers appearing in FIG. 17 indicate page numbers. In the sheet bundle of FIG. 17, images corresponding to even-numbered pages are printed on respective upper surfaces of sheets, while images corresponding to odd-numbered pages are printed on respective lower surfaces of the sheets.

The following describes steps to be performed when the CPU 205 selects the face-up output mode in step S1104 or step S1103.

In step S1112, the CPU 205 sets an initial value of "1" as page identification information N. In step S1113, the CPU 205 determines whether the page identification information N is less than or equal to than M. If it is, the process proceeds to step S1114, and if it is not, the process proceeds to step S1115.

In step S1114, the CPU 205 causes a sheet to be fed and executes printing of the (M−N+1)-th page on the sheet. In step S1115, the CPU 205 determines whether N−3 is greater than zero. If it is, the process proceeds to step S1116, and if it is not, the process proceeds to step S1117. In step S1116, the CPU 205 executes printing of the (M−N+4)-th page on the sheet transported from the refeeding path 332. Then, printing on a sheet transported from the refeeding path 332 and printing on a sheet fed from a sheet source, e.g., a cassette, are alternately repeated to print on both sides of the sheets.

In step S1117, the CPU 205 adds two to N. The process then proceeds to step S1118, where the CPU 205 determines whether the page identification information N has become equal to M+5. If it is determined that N=M+5 is true, the process proceeds to step S1119, and if it is not, the process returns to step S1113.

The order of printing that the CPU 205 causes the printer unit 203 to perform in steps S1112 to S1118 will now be described. The following description refers to the case in which a print job includes image data for ten pages and the cassette 311 is selected as the source where the sheets will be fed from.

First, the CPU 205 causes the printer unit 203 to feed three sheets from the cassette 311 and to print image data for the tenth, eighth, and sixth pages on the three respective sheets. Then, the CPU 205 causes the printer unit 203 to transport these three printed sheets along the refeeding path 332.

Next, the CPU 205 causes the printer unit 203 to transport a sheet on which image data for the tenth page has been printed to the transfer device 325, where image data for the ninth page is printed on the sheet. The CPU 205 then causes the printer unit 203 to transport, to the stacker apparatus 104, the sheet on which image data for both the tenth and ninth pages has been printed. Next, the CPU 205 causes the printer unit 203 to print image data for the fourth page on a sheet fed from the cassette 311.

The CPU 205 next causes the printer unit 203 to transport a sheet on which image data for the eighth page has been printed to the transfer device 325, where image data for the seventh page is printed on the sheet. Then, the CPU 205 causes the printer unit 203 to print image data for the second page on a sheet fed from the cassette 311. Subsequently, the CPU 205 causes the printer unit 203 to sequentially transport, along the refeeding path 332 to the transfer device 325, the sheets on which image data for the sixth, fourth, and second pages has been printed. Then, the CPU 205 causes the printer unit 203 to print image data for the fifth, third, and first pages on the sheets on which image data for the sixth, fourth, and second pages, respectively, has been printed.

Figure 18:
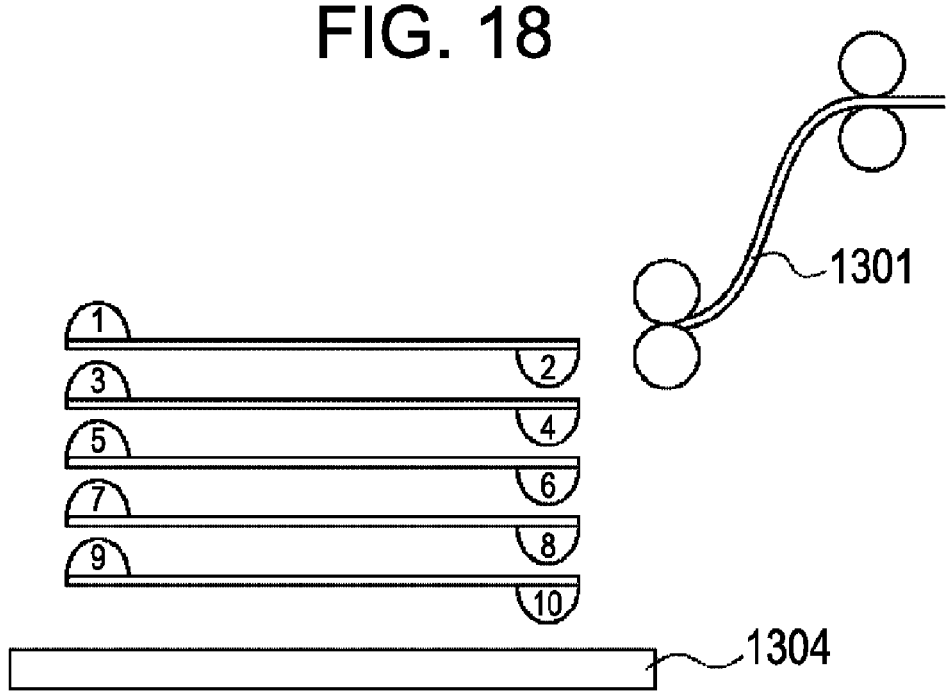
FIG. 18 is a schematic illustration of a sheet bundle placed on the stacker tray.

Thus, the order of printing of image data for a plurality of pages is 10-8-6-9-4-7-2-5-3-1. The order of printing in the face-up output mode (left-edge binding mode) is the reverse of that in the face-down output mode (right-edge binding mode). FIG. 18 is a schematic illustration of a sheet bundle placed on the stacker tray 1304 in this case. Numbers appearing in FIG. 18 indicate page numbers. In the sheet bundle of FIG. 18, images corresponding to odd-numbered pages are printed on respective upper surfaces of sheets, while images corresponding to even-numbered pages are printed on respective lower surfaces of the sheets.

As described above, according to the present embodiment, the printing system 2000 is capable of ejecting sheets either in the face-down output mode, which allows the sheets to be output in a reversed state, or in the face-up output mode, which allows the sheets S to be output in a non-reversed state. Also, the printing system 2000 can ensure a consistent output state (i.e., face-up output mode or face-down output mode) of sheet bundles processed in a plurality of different print jobs and sequentially ejected to the stacker tray 1304.

Although it has been described that a print job is input from the computer terminal 233, it may be input in other ways. For example, the scanner unit 201 of the printing apparatus 105 may read a plurality of documents as image data and thereby input a print job. In this case, the settings of the print job can be defined via the operating unit 204 instead of being defined via the printer driver 1003 as illustrated in FIGS. 7 to 9.

Other Exemplary Embodiments

The present invention can also be achieved by supplying, to a system or apparatus, a storage medium on which software program code for performing the functions of the above-described exemplary embodiments is recorded. The functions of the above-described exemplary embodiments can be performed when a computer of the system or apparatus reads and executes the program code stored in the storage medium. In this case, the program code read out of the storage medium performs the functions of the above-described exemplary embodiments, and thus the storage medium on which the program code is recorded constitutes the present invention.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2006-020971 filed Jan. 30, 2006, which is hereby incorporated by reference herein in its entirety.

What is claimed is:

1. A printing apparatus which can be connected to an external apparatus via a network comprising:
    a receiving unit configured to receive a print job including image data for a plurality of pages and sheet stacking information for specifying one of a first stacking mode and a second stacking mode, the print job being transmitted from the external apparatus;
    a printing unit configured to perform printing on a plurality of sheets based on the print job received by the receiving unit;
    a stacking unit configured to stack the plurality of sheets printed by the printing unit;
    a reversing unit configured to reverse at least one sheet printed by the printing unit before the at least one sheet is placed on the stacking unit;
    a detecting unit configured to detect whether the stacking unit contains any sheets; and
    a selecting unit configured to select either the first stacking mode or the second stacking mode for the received print job based on the sheet stacking information in a case where the detecting unit detects that the stacking unit contains any sheets, and to select either the first stacking mode or the second stacking mode for the received print job based on the stacking mode selected for the previous print job, the first stacking mode being a mode in which at least one sheet printed by the printing unit is reversed by the reversing unit and output to the stacking unit and the second stacking mode being a mode in which at least one sheet printed by the printing unit is output to the stacking unit without being reversed by the reversing unit.

2. A method for printing with a printing apparatus which can be connected to an external apparatus via a network, the method comprising:
    receiving a print job including image data for a plurality of pages and sheet stacking information for specifying one of a first stacking mode and a second stacking mode, the print job being transmitted from the external apparatus;
    printing on a plurality of sheets based on the print job received in the receiving step;
    detecting whether a stacking unit configured to stack the plurality of printed sheets contains any sheets;
    selecting either the first stacking mode or the second stacking mode for the received print job based on the sheet stacking information in a case where it is detected that the stacking unit contains any sheets, and selecting either the first stacking mode or the second stacking mode for the received print job based on the stacking mode selected for the previous print job, the first stacking mode being one in which at least one printed sheet is reversed and output to the stacking unit and the second stacking mode being a mode in which at least one printed sheet is output to the stacking unit without being reversed; and
    stacking, on the stacking unit, the plurality of printed sheets output in the selected stacking mode.

3. A printing system, the system comprising:
a printing apparatus which can be connected to an external apparatus via a network; and
a sheet processing apparatus,
wherein the printing apparatus comprises:
- a receiving unit configured to receive a print job including image data for a plurality of pages and sheet stacking information for specifying one of a first stacking mode and a second stacking mode, the print job being transmitted from the external apparatus;
- a printing unit configured to perform printing on a plurality of sheets based on the print job received by the receiving unit;
- a stacking unit configured to stack the plurality of sheets printed by the printing unit;
- a reversing unit configured to reverse at least one sheet printed by the printing unit before the at least one sheet is placed on the stacking unit;
- a detecting unit configured to detect whether the stacking unit contains any sheets; and
- a selecting unit configured to select either the first stacking mode or the second stacking mode for the received print job based on the sheet stacking information in a case where the detecting unit detects that the stacking unit contains any sheets, and to select either the first stacking mode or the second stacking mode for the received print job based on the stacking mode selected for the previous print job, the first stacking mode being a mode in which at least one sheet printed by the printing unit is reversed by the reversing unit and output to the stacking unit and the second stacking mode being a mode in which at least one sheet printed by the printing unit is output to the stacking unit without being reversed by the reversing unit, and wherein the sheet processing apparatus performs sheet processing on the plurality of sheets processed by the printing unit.

* * * * *